Nov. 9, 1971   D. S. CHISHOLM   3,618,339

UNIVERSAL JOINT

Filed Jan. 30, 1970

INVENTOR.
Douglas S. Chisholm
BY
Robert B. Ingraham
AGENT

United States Patent Office 3,618,339
Patented Nov. 9, 1971

3,618,339
UNIVERSAL JOINT
Douglas S. Chisholm, Midland, Mich., assignor to The Dow Chemical Company, Midland, Mich.
Filed Jan. 30, 1970, Ser. No. 7,129
Int. Cl. F16d 3/62
U.S. Cl. 64—12  5 Claims

ABSTRACT OF THE DISCLOSURE

A universal joint is prepared without bearings and having flexing members at right angles to each other whose major cross-sectional dimension is parallel to the axis of rotation of the shafts.

---

This invention relates to an improved universal joint, and more particularly is concerned with a universal joint having no mechanical bearings and depends upon the flexing of generally elongate members for operation.

A wide variety of universal joints are known which operate by means of flexing of a formed member to simplify construction thereof. Some of such universal joints are disclosed in the following U.S. patents: 3,224,224; 3,332,255; 2,451,791; 2,860,495 and 3,405,539. Some of such universal or flexible joints are true Cardan joints while others are not and result in some minor eccentricity or side thrust transmitted to the rotating shafts. For many purposes such universal joints are eminently satisfactory. However, some disadvantages exist with universal flexible joints employing the principle of a flexible member or members rigidly fixed to one of the rotating shafts. Some of these difficulties are lack of operation as a true Cardan joint and thrust developed due to torque; the flexing members transmitting torque by shear stresses induced in essentially the edge of the flexible member. Many such joints do not provide reliable high speed operation and are not readily dynamically balanced. Many such flexible joints are not capable of transmitting high torque or high torque at high speed when considered on the basis of torque transmitted per unit weight.

It would be desirable if there were available an improved Cardan joint.

It would also be desirable if there were available an improved Cardan joint of simplified construction which required no mechanical bearings and hence, no lubrication.

It would also be desirable if there were available an improved Cardan joint construction which transmitted relatively high torque per unit weight and was shock absorbing.

These benefits and other advantages in accordance with the present invention are achieved in a universal joint, the universal joint comprising a first yoke member and a second yoke member, the first yoke member having an axis of rotation and first and second first yoke member arms, the first member yoke arms being generally symmetrically disposed about the axis of rotation, a second yoke member having first and second second yoke member arms and an axis of rotation, the first and second second yoke member arms being generally symmetrically disposed about the axis of rotation, the first and second yokes being oppositely disposed and first and second yoke arms of the first and second yoke members being interdigitated and lying in planes generally normal to each other, a hub member having an axis of rotation, the hub member being generally centrally disposed between the first and second yoke arms of the first and second yoke members, at least one flexible member extending from each of the yoke arms to the hub member, the flexible members being of generally elongate configuration and the dimension of the cross-sectional configuration of the flexible members lying in a plane containing the axes of rotation of the hub member, and first and second yoke members being equal to or greater than the dimension of the cross-sectional configuration in a plane normal to the axes of rotation.

Further features and advantages of the present invention will become more apparent from the following specification taken in connection with the drawing wherein.

Figure 1:
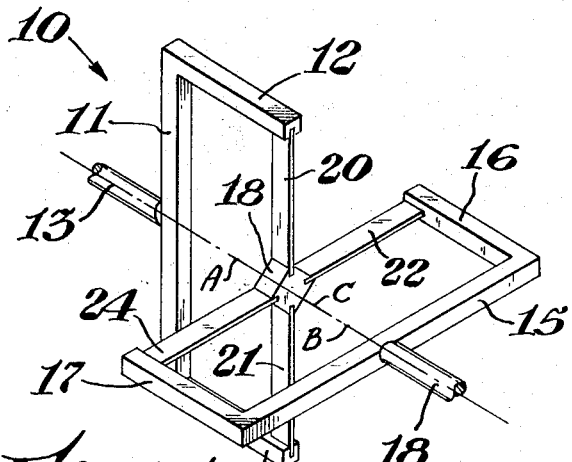
FIG. 1 depicts schematically an isometric view of a joint in accordance with the invention.

In FIG. 1 there is schematically illustrated a cutaway view of the joint of the present invention generally designated by the reference numeral 10. The universal joint 10 comprises a first yoke member 11. The yoke member 11 has a first yoke arm 12 and a second yoke arm 13. The yoke 11 is rigidly affixed to a shaft or rotating member 13 having an axis of rotation A. The yoke arms 12 and 13 are generally symmetrically and oppositely disposed about the axis A. A second yoke member 15 is generally oppositely disposed from the first yoke member 11. The second yoke member 15 has a first yoke arm 16 and a second yoke arm 17. For purposes of illustration, the yoke arms 11 and 15 may be considered to have identical configurations. The yoke 15 has affixed thereto a rotating member or shaft 18 having an axis of rotation B. As designated in FIG. 1, the axes A and B are colinear and the yoke arms 16 and 17 of the second yoke member 15 are disposed in a plane generally normal to a plane containing the yoke arms 12 and 13 of the yoke 11. The yoke arms 12 and 13 may be considered to be circularly interdigitated with the yoke arms 16 and 17. A hub or central member 18 is generally centrally disposed between the yoke arms 12, 13, 16 and 17. The hub 18 has an axis of rotation C which, as depicted in FIG. 1, is colinear with the axes A and B. A first flexible member 20 is affixed between the arm 12 and the hub 18. A second flexible member 21 is affixed between the arm 13 and the hub 18. A third flexible member 22 is affixed between the arm 16 and the hub 18. A fourth flexible member 24 is affixed between the arm 17 and the hub 18. The flexible members 20 and 21 lie in a plane generally normal to a plane containing the flexible members 22 and 24 and each of the planes is generally parallel to the axes of rotation A, B and C. The dimensions of cross-sectional configurations of the flexible members 20, 21, 22 and 24 in a plane generally containing the axes A, B and C must be equal to or beneficially greater than the dimension of the cross-sectional configuration of the flexible members in a plane normal to the axes A, B and C.

The flexible members 20, 21, 22 and 24 may be prepared from any suitable material having the necessary flexibility and strength required by the particular application for which the joint is designed. Plastics such as nylon 6, nylon 66, ethyl cellulose are eminently satisfactory for many applications, particularly those wherein it is desired to form such a joint or components of the joint by molding. Flexible reinforced plastics such as glass fiber reinforced polyester resins, epoxy resins, polycarbonates, nylon and the like are found satisfactory for applications requiring more severe operating conditions. Beneficially for high speed, high torque and/or high temperature applications, the flexible members advantageously may be steel, stainless steel and beneficially beryllium copper. The method of fastening the flexible member to the hub and yoke arms is dependent upon the desired materials of construction. Welding, brazing, bolting, clamping, adhering, integral molding and like techniques are employed with appropriate materials. Beneficially if desired, the flexible members may employ a tapered configuration. Minimal thickness occurs generally midway between the yoke arm and the hub, thereby avoiding stress concentration. The cross-sectional configuration of the flexible members may have a wide variety of shapes, including round, square, hexagonal, elliptical, rectangular. However, the dimension of the cross-sectional configuration of the flexible member in a plane generally containing the axes of rotation must be equal to or greater than the dimension in a plane normal to the axis.

Figure 2:
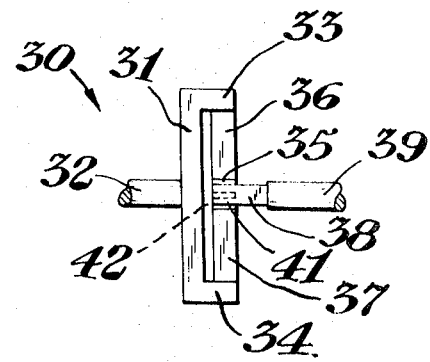
FIG. 2 is a side view of a joint in accordance with the present invention.

In FIG. 2 there is depicted a side view of a universal joint in accordance with the invention generally designated by the reference numeral 30. The joint 30 is a functional non-schematic configuration. A first generally rectangular yoke 31 is affixed to a shaft or hub 32. The yoke 31 has first and second yoke arms 33 and 34. A hub or central member 35 is disposed between the arms 33 and 34 and is joined to the arms 33 and 34 by means of flat flexible members 36 and 37. A second yoke 38 of generally similar design having torque transmitting means 39 such as a hub or shaft is affixed thereto. One arm 41 of the yoke 38 is shown. A flexible member 42 connects the central member 35 to the arm 41. A similar flexible member not shown connects the remaining arm of the yoke 38 to the hub 35.

The configuration of the joint 30 as depicted in FIG. 2 is the configuration of the joint which is required to operate at only a few degrees deviation from between the axes of rotation of the yoke members. As the required deviation is increased, generally the length of the flexible member, such as the members 36, 37 and 42, are proportionately increased to maintain the stress level induced in flexible members below the level at which fatigue is a significant factor.

Figure 3:
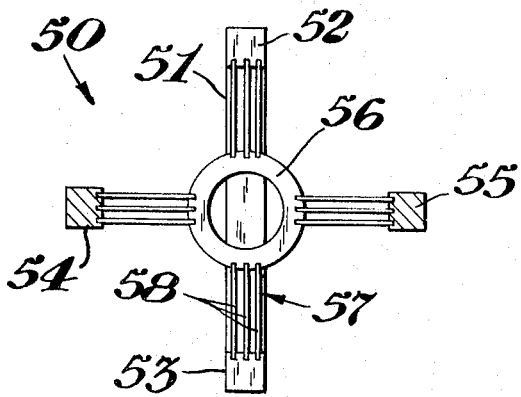
FIG. 3 is a sectional view of one embodiment of a joint in accordance with the present invention.

In FIG. 3 there is depicted a sectional view of an alternate embodiment of the invention generally designated by the reference numeral 50. The embodiment 50 comprises a first yoke 51 having a first arm 52 and a second arm 53, a second yoke, not shown, having a first arm 54 and a second arm 55. A generally annular central or hub member 56 is centrally disposed between the arms 52, 53, 54 and 55. Each of the arms 52, 53, 54 and 55 is joined to the hub member 51 by a generally planar flexible member 57. Each of the members 57 comprise a plurality of flexible members 58. Each of the members 58 is joined to the arm and to the hub member. However, in at least a portion of the distance between the hub member and the arms, the laminate 58 is unconnected; that is, they are free to move relative to one another when torsion is applied by means of the hub and arm.

Employing the embodiment of FIG. 3, increased annular deviation is possible between driven and driving shafts at increased torque levels without the requirement of lengthening the flexible members. In applications where maximum torque is desired, generally it is desirable to increase the diameter of the hub member to reduce the lateral shear force on the flexible member.

Figure 4:
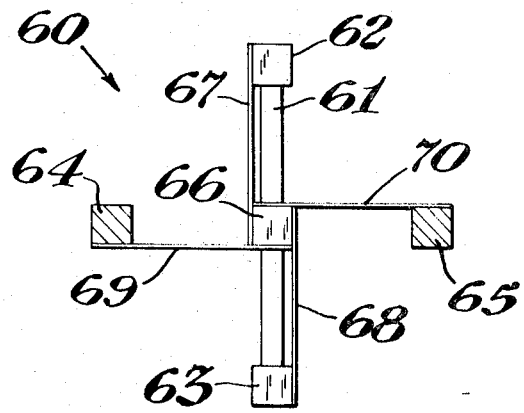
FIG. 4 is a schematic representation of a hub member and flexible members particularly adapted for monodirectional rotation.

In FIG. 4 there is depicted a cutaway view of a universal joint generally designated by the reference numeral 60. The joint 60 comprises a first yoke 61 having a first generally retangular arm 62 and a second generally rectangular arm 63. Similar arms 64 and 65 are shown which are affixed to a second yoke, not shown. A rectangular central hub 66 is centrally disposed between the arms 62, 63, 64 and 65. The hub 66 is connected to the arms 62, 63, 64 and 65 by generally planar flexible members 67, 68, 69 and 70, respectively. Pairs of flexible members that is, the members 67 and 68, lie in parallel planes parallel to the axis of rotation which corresponds to the center of the hub 66. Similarly, the flexible members lie in planes parallel to the axis of rotation and are generally equally spaced therefrom. The joint as depicted in FIG. 4 is constructed with minimal difficulty and generally from readily available materials with a minimum of machining. The ease of manufacture is somewhat offset by the non-radial positioning of the flexible elements and requirement for more conservative design.

Figure 5:
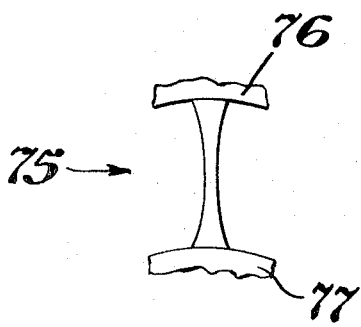
FIGS. 5 and 6 are views of flexible members suitable for use in the practice of the present invention.

FIG. 5 depicts an edge view of a flexible element generally designated by the reference numeral 75 wherein the cross-sectional configuration is minimal in the center and increases toward a yoke arm 76 and increases toward a hub or central member 77.

Figure 6:
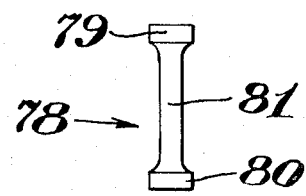

A side view of a yoke arm 78 is depicted in FIG. 6 wherein end attachment portions 79 and 80 have a maximum width and a central portion 81 has a minimal width, the width smoothly tapering from the ends toward the center.

Both the flexible members depicted in FIGS. 5 and 6 are employed to reduce stress concentration and prolong the life of the flexible members, if desired. The flexible members may taper in both width and thickness.

By way of further illustration, a universal joint is prepared in accordance with the present invention having a configuration generally as depicted in FIG. 2 wherein a hub corresponding to the hub member 35 has an outside diameter of ¾ inch and the distance between the yoke arms of each yoke is 2¾ inches. The yokes and hub are of steel and the flexible members are also of steel ¹⁄₁₆ inch inch in thickness, ⅝ inch in width and having a working length; that is, distance between hub and arm, of one inch. The assembly is joined by brazing developing calculated 60 pound per square inch stress and 0.3° deviation and operates eminently satisfactorily while rotating at about 3600 revolutions per minute and flexing at a frequency of about 1000 cycles per second. Employing flexible member 0.125 inch in thickness and of otherwise like dimension, the calculated stress is 130 pounds per square inch.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A universal joint, the universal joint comprising a first yoke member and a second yoke member, the first yoke member having an axis of rotation and first and second first yoke member arms, the first yoke member arms being generally symmetrically disposed about the axis of rotation, the second yoke member having first and second second yoke member arms and an axis of rotation, the first and second second yoke member arms being generally symmetrically disposed about the axis of rotation, the first and second yoke members being oppositely disposed and the first and second yoke member arms of the first and second yoke members being interdigitated and lying in planes generally normal to each other, a hub member having an axis of rotation, the hub member being generally centrally disposed between the first and second yoke arms of the first and second yoke members, at least one flexible member extending from each of the yoke arms to the hub member, the flexible members being of generally elongate, flat strip configuration and the dimension of the cross-sectional configuration of the flexible members lying in a plane passing through the axis of rotation of the hub member and first and second yoke members being greater than the dimension of the cross-sectional configuration in a plane being normal to the axis.

2. The universal joint of claim 1 wherein each of the flexible members comprises a plurality of generally parallel flat strips.

3. The universal joint of claim 1 wherein the hub has a generally annular configuration.

4. The universal joint of claim 1 wherein the flexible elements connected to the first yoke member arms are generally coplanar and the elements connected to the second arm are generally coplanar.

5. A universal joint, the universal joint comprising generally like first and second yoke members, each of the yoke members having first and second yoke member arms, each of the yoke members having rigidly affixed thereto a rotating member having an axis of rotation, the yoke members adapted to rotate about the axis of rotation and the first and second yoke arms of the first and second yoke members being symmetrically disposed about the axis of rotation, the first and yoke members being in generally opposed facing relationship with the yoke member arms of the first and second yokes in generally circularly interdigitated relationship and lying in planes generally normal to each other, a hub member centrally disposed between the yoke arms, at least four flexible elements having first and second ends the elements having the configuration of flat strips, at least one of the flexible elements having the first end thereof affixed to one of the yoke arms, the second end being affixed to the hub member so that each yoke arm is connected by a flexible element to the hub, the strips having the major dimension of the cross-sectional configuration generally oriented in a plane which contains the axes of rotation of the first and second yoke members.

References Cited
UNITED STATES PATENTS 3,063,262    11/1962    Greene et al.    64—27
3,238,743    3/1966    Burroughs    64—12

EDWARD G. FAVORS, Primary Examiner

U.S. Cl. X.R.

64—19